US012683683B2

(12) United States Patent (10) Patent No.: US 12,683,683 B2

Satou (45) Date of Patent: Jul. 14, 2026

(54) OPTICAL TRANSMISSION DEVICE, OPTICAL TRANSMISSION METHOD, AND RECORDING MEDIUM

(71) Applicant: NEC Corporation, Tokyo (JP)

(72) Inventor: Yoshirou Satou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 272 days.

(21) Appl. No.: 18/567,909

(22) PCT Filed: Jun. 14, 2021

(86) PCT No.: PCT/JP2021/022518

§ 371 (c)(1),
(2) Date: Dec. 7, 2023

(87) PCT Pub. No.: WO2022/264208

PCT Pub. Date: Dec. 22, 2022

(65) Prior Publication Data

US 2024/0275482 A1 Aug. 15, 2024

(51) Int. Cl.
*H04B 10/077* (2013.01)

(52) U.S. Cl.
CPC ................................ *H04B 10/0775* (2013.01)

(58) Field of Classification Search
CPC .................................................. H04B 10/0775
USPC ......................................................... 398/177
See application file for complete search history.

(56) References Cited

U.S. PATENT DOCUMENTS

| | | | | |
|---|---|---|---|---|
| 8,121,486 B2 * | 2/2012 | Uda | ................... | H04B 10/0777 |
| | | | | 398/79 |
| 2004/0208430 A1 * | 10/2004 | Chin | ................. | H04B 10/0775 |
| | | | | 385/24 |
| 2009/0010657 A1 * | 1/2009 | Kazutaka | ............... | H04B 10/29 |
| | | | | 398/173 |

(Continued)

FOREIGN PATENT DOCUMENTS

| | | | | |
|---|---|---|---|---|
| EP | 2086132 A1 * | 8/2009 | ....... | H04B 10/07953 |
| JP | 2000-332695 A | 11/2000 | | |

(Continued)

OTHER PUBLICATIONS

International Search Report for PCT Application No. PCT/JP2021/022518, mailed on Aug. 31, 2021.

(Continued)

*Primary Examiner* — Amritbir K Sandhu
(74) *Attorney, Agent, or Firm* — Sughrue Mion, PLLC

(57) ABSTRACT

An optical transmission device includes: an optical amplifier that amplifies first signal light; a monitoring light generation unit that generates first monitoring light; an optical multiplexer that couples an output of the optical amplifier and an output of the monitoring light generation unit to output the resultant to a first optical transmission line; an optical demultiplexer for separating light that includes second signal light and second monitoring light and that is inputted through a second optical transmission line, into the second signal light and the second monitoring light; and a control unit that controls the optical amplifier and the monitoring light generation unit on the basis of the reception state of the second signal light and the duration time of emission and reduction of the second monitoring light.

14 Claims, 13 Drawing Sheets

(56) References Cited

U.S. PATENT DOCUMENTS

| 2011/0008051 | A1* | 1/2011 | Miyaji | H04J 14/0275 |
| | | | | 398/79 |
| 2011/0085798 | A1* | 4/2011 | Kikuchi | H04B 10/0775 |
| | | | | 398/34 |
| 2014/0072296 | A1* | 3/2014 | Montalvo Garcia | ..................... |
| | | | | H04B 10/0775 |
| | | | | 398/16 |
| 2014/0126897 | A1* | 5/2014 | Nakata | H04B 10/0771 |
| | | | | 398/2 |
| 2020/0169320 | A1* | 5/2020 | Kiyama | H04J 14/0267 |
| 2021/0328667 | A1* | 10/2021 | Matsumoto | G01M 11/00 |
| 2023/0224034 | A1* | 7/2023 | Igarashi | H04B 10/07955 |
| | | | | 398/37 |
| 2024/0275482 | A1* | 8/2024 | Satou | H04B 10/0775 |

FOREIGN PATENT DOCUMENTS

| JP | 2002-077056 A | 3/2002 |
| JP | 2011-019140 A | 1/2011 |
| JP | 2014-093746 A | 5/2014 |
| JP | 2020-088547 A | 6/2020 |
| WO | 2012/111403 A1 | 8/2012 |

OTHER PUBLICATIONS

English translation of Written opinion for PCT Application No. PCT/JP2021/022518, mailed on Aug. 31, 2021.

* cited by examiner

Fig.1

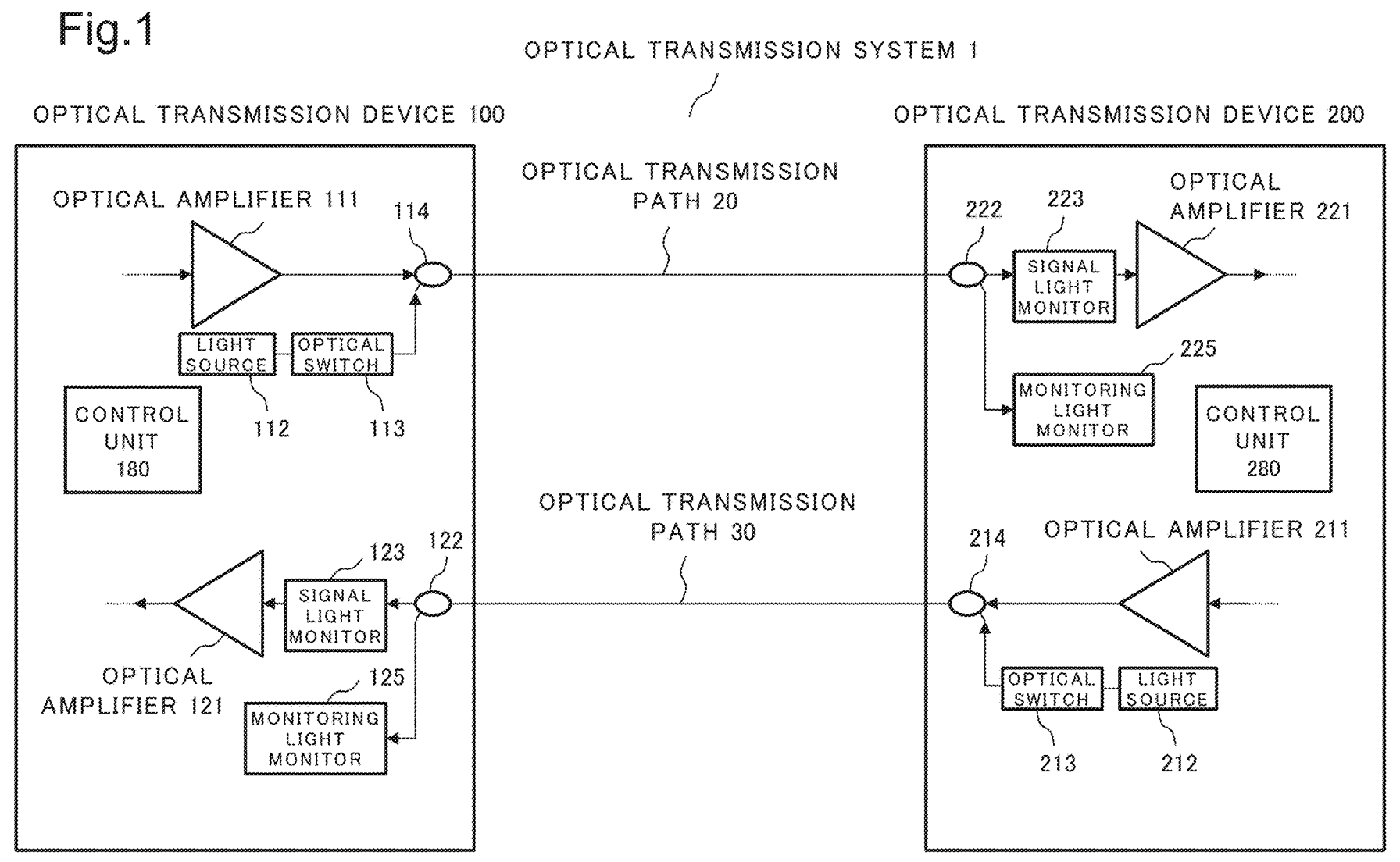

OPTICAL TRANSMISSION SYSTEM 1

OPTICAL TRANSMISSION DEVICE 200

OPTICAL AMPLIFIER 221

CONTROL UNIT 280

OPTICAL AMPLIFIER 211

SIGNAL LIGHT MONITOR 223

MONITORING LIGHT MONITOR 225

LIGHT SOURCE 212

OPTICAL SWITCH 213

222

214

OPTICAL TRANSMISSION PATH 20

OPTICAL TRANSMISSION PATH 30

OPTICAL TRANSMISSION DEVICE 100

OPTICAL AMPLIFIER 111

114

OPTICAL SWITCH 113

LIGHT SOURCE 112

CONTROL UNIT 180

SIGNAL LIGHT MONITOR 123

MONITORING LIGHT MONITOR 125

OPTICAL AMPLIFIER 121

| NUMBER | OPERATION | CONDITION |
|---|---|---|
| 501 | SHUT DOWN OPTICAL AMPLIFIER ON TRANSMISSION SIDE | "SIGNAL LIGHT INPUT IS DISCONNECTED", "MONITORING LIGHT INPUT IS DISCONNECTED", AND "OPTICAL AMPLIFIER ON TRANSMISSION SIDE IS NOT SHUT DOWN" |
| 502 | • CANCEL SHUTDOWN OF OPTICAL AMPLIFIER • IN CASE WHERE MONITORING LIGHT OF PULSED LIGHT IS OUTPUT, CHANGE MONITORING LIGHT TO CONTINUOUS LIGHT | "OPTICAL AMPLIFIER IS IN SHUTDOWN STATE" AND "6 SECONDS ELAPSE AFTER MONITORING LIGHT INPUT BECOMES NORMAL", OR "SIGNAL LIGHT INPUT BECOMES NORMAL" |
| 503 | CHANGE MONITORING LIGHT OUTPUT FROM CONTINUOUS LIGHT TO PULSED LIGHT | "SIGNAL LIGHT INPUT IS DISCONNECTED", "MONITORING LIGHT INPUT IS DISCONNECTED", "NO PULSED LIGHT IS INPUT", AND "MONITORING LIGHT OUTPUT IS CONTINUOUS LIGHT" |
| 504 | CHANGE MONITORING LIGHT OUTPUT FROM PULSED LIGHT TO CONTINUOUS LIGHT | FIRST-TIME INPUT OF PULSED LIGHT |

Fig.12

| NUMBER | SETTING ON MONITORING LIGHT OUTPUT | GENERATION PROCEDURE |
|---|---|---|
| 601 | CONTINUOUS LIGHT | SET IN SUCH WAY THAT MONITORING LIGHT CONSTANTLY PASSES THROUGH OPTICAL SWITCH<br>IN CASE WHERE CONDITION OF OUTPUTTING PULSED LIGHT IS SATISFIED, IMMEDIATELY CHANGE TO PULSE SIGNAL |
| 602 | PULSED LIGHT | SET OPTICAL SWITCH TO 10 SECONDS ON DISCONNECTED SIDE, AND 3 SECONDS ON TRANSMISSION SIDE IN THIS ORDER, AND REPEAT THE SAME<br>IN CASE WHERE CONDITION OF OUTPUTTING CONTINUOUS LIGHT IS SATISFIED, IMMEDIATELY CHANGE TO CONTINUOUS LIGHT |

Fig.13

| NUMBER | INPUT DETERMINATION OF MONITORING LIGHT | CONDITION |
|---|---|---|
| 701 | CONTINUOUS LIGHT | STATE IS CHANGED FROM INPUT DISCONNECTION OF MONITORING LIGHT TO NORMAL, AND NORMAL STATE CONTINUES FOR 6 SECONDS OR LONGER |
| 702 | PULSED LIGHT | STATE IS CHANGED FROM INPUT DISCONNECTION OF MONITORING LIGHT TO NORMAL, AND NORMAL STATE CONTINUES FOR LESS THAN 6 SECONDS |

OPTICAL TRANSMISSION DEVICE, OPTICAL TRANSMISSION METHOD, AND RECORDING MEDIUM

This application is a National Stage Entry of PCT/JP2021/ 022518 filed on Jun. 14, 2021, the contents of all of which are incorporated herein by reference, in their entirety.

TECHNICAL FIELD

The present invention relates to an optical transmission device, an optical transmission method, and a recording medium. The present invention particularly relates to automatic power reduction (APR) control in which an output of an optical amplifier included in an optical transmission device is automatically lowered at a time of failure of an optical transmission path connected to the optical transmission device.

BACKGROUND ART

There is a case that an optical transmission device includes an APR control function in order to secure safety of a worker performing a maintenance work for a disconnected portion, in a case where an optical fiber of an optical transmission path that connects two optical transmission devices performing bi-directional communication is disconnected. APR control automatically lowers output power of signal light to be sent to a disconnected optical fiber, or stops output of signal light. In a general land optical transmission system, information for APR control is transmitted between optical transmission devices by encoding a frame of a monitoring signal of 1.544 megabits per second (Mb/s) or the like. The monitoring signal is also called an optical supervisory channel (OSC) signal. In a general land optical transmission system, the monitoring signal includes many pieces of information for use in other than APR control. Therefore, the optical transmission device that receives the monitoring signal decodes a frame of the monitoring signal, and performs APR control in a case where information necessary for APR control is decoded from the monitoring signal.

Concerning the present invention, PTLs 1 and 2 describe general APR control in which, when disconnection of a main signal or disconnection of a monitoring signal is detected, output of an optical amplifier is lowered by notifying a counterpart device accordingly.

CITATION LIST

Patent Literature

PTL 1: Japanese Unexamined Patent Application Publication No. 2000-332695
PTL 2: Japanese Unexamined Patent Application Publication No. 2002-077056

SUMMARY OF INVENTION

Technical Problem

A monitoring control circuit of a general land optical transmission system includes an encoding circuit and a decoding circuit in order to transmit monitoring control signals of many types. Further, a signal for APR control is sent together with another monitoring control signal, and therefore, there is a problem that, when a monitoring control circuit for use in a general land optical transmission system is applied to an optical transmission system in which only a signal for APR control is required as a monitoring control signal, a function of the monitoring control circuit becomes complicated more than necessary, which becomes a factor of cost increase.

OBJECT OF INVENTION

An object of the present invention is to provide a technique of achieving an APR control function of an optical transmission system with a simple configuration.

Solution to Problem

An optical transmission device according to the present invention includes:
an optical amplifying means for amplifying first signal light;
a monitoring light generation means for generating first monitoring light;
an optical multiplexing means for combining an output of the optical amplifying means and an output of the monitoring light generation means, and outputting the combined output to a first optical transmission path;
an optical demultiplexing means for separating light including second signal light and second monitoring light, and being input from a second optical transmission path, into the second signal light and the second monitoring light; and
a control means for controlling the optical amplifying means and the monitoring light generation means, based on a reception state of the second signal light, and a duration time of light emission and light weakening of the second monitoring light.

An optical transmission method according to the present invention includes:
amplifying first signal light;
generating first monitoring light;
combining the amplified first signal light and the first monitoring light, and outputting the combined light to a first optical transmission path;
separating light including second signal light and second monitoring light, and being input from a second optical transmission path, into the second signal light and the second monitoring light; and
controlling amplification of the first signal light and generation of the first monitoring light, based on a reception state of the second signal light, and a duration time of light emission and light weakening of the second monitoring light.

A recording medium according to the present invention is a recording medium recording a program that causes a computer of an optical transmission device provided with
an optical amplifying means for amplifying first signal light, a monitoring light generation means for generating first monitoring light,
an optical multiplexing means for combining an output of the optical amplifying means and an output of the monitoring light generation means, and outputting the combined output to a first optical transmission path, and
an optical demultiplexing means for separating light including second signal light and second monitoring light, and being input from a second optical transmission path, into the second signal light and the second monitoring light, to execute a procedure of controlling the optical amplifying means and the monitoring light generation means, based on a reception state of the second signal light, and a duration time of light emission and light weakening of the second monitoring light.

Advantageous Effects of Invention

The present invention is able to achieve an APR control function of an optical transmission system with a simple configuration.

BRIEF DESCRIPTION OF DRAWINGS

FIG. 1 is a block diagram illustrating a configuration example of an optical transmission system 1.

FIG. 2 is a block diagram illustrating an example of a bidirectional failure in the optical transmission system 1.

FIG. 11 is a diagram illustrating an example of an operation in APR control, and a condition in which the operation is performed.

FIG. 12 is a diagram illustrating an output pattern of monitoring light, and an operation example of an optical switch at the occasion.

FIG. 13 is a diagram illustrating a determination condition as to whether received monitoring light is continuous light or pulsed light.

EXAMPLE EMBODIMENT

Figure 3:
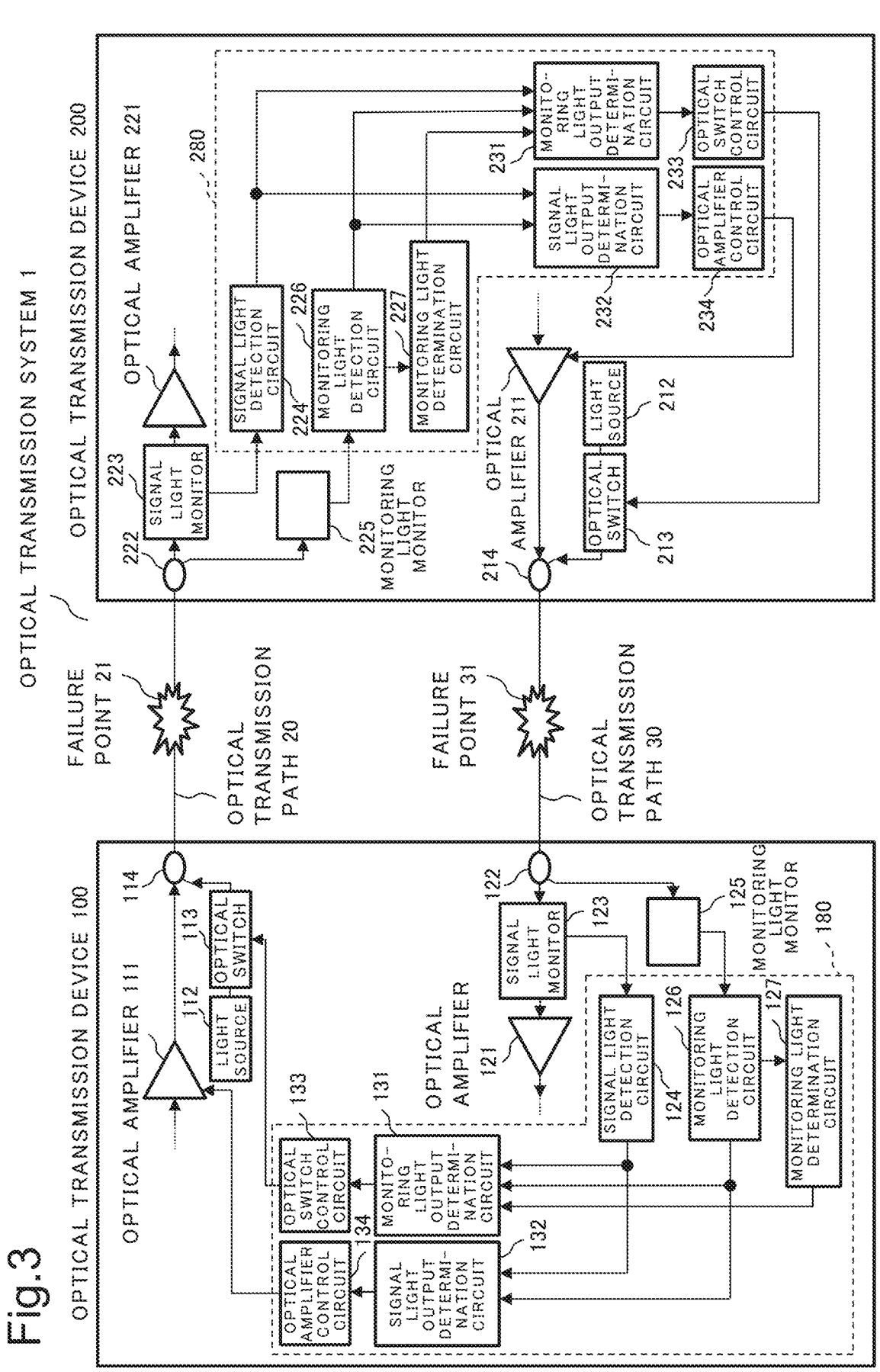
FIG. 3 is a block diagram illustrating an example of a detailed configuration of optical transmission devices 100 and 200.

Hereinafter, example embodiments according to the present invention are described with reference to the drawings. A direction of an arrow illustrated in the drawings is an example, and the description does not intend to limit a direction. In the example embodiments and the drawings, the same reference sign is attached to an already mentioned element, and overlapping description is omitted.

First Example Embodiment

FIG. 1 is a block diagram illustrating a configuration example of an optical transmission system 1 in a first example embodiment according to the present invention. The optical transmission system 1 includes an optical transmission device 100 and an optical transmission device 200. The optical transmission device 100 and the optical transmission device 200 are connected to each other by two optical transmission paths 20 and 30.

The optical transmission device 100 transmits an optical signal to the optical transmission path 20. The optical transmission device 200 receives, from the optical transmission path 20, an optical signal transmitted from the optical transmission device 100. The optical transmission device 200 transmits an optical signal to the optical transmission path 30. The optical transmission device 100 receives, from the optical transmission path 30, an optical signal transmitted from the optical transmission device 200. Hereinafter, a direction from the optical transmission device 100 to the optical transmission device 200 may be described as "downlink", and a direction from the optical transmission device 200 to the optical transmission device 100 may be described as "uplink". In this way, the optical transmission device 100 and the optical transmission device 200 communicate with each other, while facing each other via the optical transmission paths 20 and 30.

The optical transmission device 100 includes an optical amplifier 111, a light source 112, an optical switch 113, an optical multiplexer 114, an optical demultiplexer 122, a signal light monitor 123, a monitoring light monitor 125, and a control unit 180. The optical transmission device 200 includes an optical amplifier 211, a light source 212, an optical switch 213, an optical multiplexer 214, an optical demultiplexer 222, a signal light monitor 223, a monitoring light monitor 225, and a control unit 280. The signal light monitor 123 and the monitoring light monitor 125 may be included in the control unit 180. The signal light monitor 223 and the monitoring light monitor 225 may be included in the control unit 280.

A function of each unit of the optical transmission device 100 is described. The optical amplifier 111 amplifies signal light (hereinafter, referred to as "downlink signal light") to be transmitted from the optical transmission device 100 to the optical transmission device 200. Downlink signal light is an optical signal including user data. An optical signal acquired by wavelength-multiplexing an optical carrier wave of a 1550 nm band may be used as signal light. The light source 112 is a light source of monitoring light (hereinafter, referred to as "downlink monitoring light") to be transmitted from the optical transmission device 100 to the optical transmission device 200. A semiconductor laser having a center wavelength of 1490 nm or 1510 nm may be used as the light source 112. A wavelength of the light source 112 does not overlap a wavelength of downlink signal light. The light source 112 may be provided outside of the optical transmission device 100. The optical switch 113 transmits or blocks light generated in the light source 112. An optical modulator may be used in place of the optical switch 113. Light transmitted through the optical switch 113 is input to the optical multiplexer 114, as downlink monitoring light. The optical switch 113 is able to output downlink monitoring light, as continuous light, or output as pulsed light having a predetermined light emission time and a predetermined light weakening time, based on control of the control unit 180. Note that "weakened light" means a state in which power of pulsed light is low, as compared with "emitted light". Specifically, "weakened light" includes a state in which pulsed light is extinguished. In other words, downlink monitoring light may be continuous light, or pulsed light in which an optical output changes with time.

The optical multiplexer 114 multiplexes downlink signal light to be output from the optical amplifier 111, and downlink monitoring light to be output from the optical switch 113, and sends the multiplexed light to the optical transmission path 20. Since a wavelength of downlink signal light and a wavelength of downlink monitoring light are different from each other, a wavelength division multiplexing (WDM) filter can be used as the optical multiplexer 114.

The optical demultiplexer 122 demultiplexes signal light (hereinafter, referred to as "uplink signal light") transmitted from the optical transmission device 200, and monitoring light (hereinafter, referred to as "uplink monitoring light"). Since a wavelength of uplink signal light and a wavelength of uplink monitoring light are different from each other, a WDM filter can be used as the optical demultiplexer 122. Uplink signal light separated by the optical demultiplexer 122 is input to the signal light monitor 123, and separated monitoring light is input to the monitoring light monitor 125.

The signal light monitor 123 outputs, to the control unit 180, a reception state of uplink signal light in the optical transmission device 100. The monitoring light monitor 125 outputs, to the control unit 180, a reception state of uplink monitoring light in the optical transmission device 100. Each of the signal light monitor 123 and the monitoring light monitor 125 includes a photo diode (PD). The signal light monitor 123 outputs uplink signal light received by the optical transmission device 100, as an optical signal itself, and outputs, to the control unit 180, an electrical signal of an amplitude proportional to an intensity of uplink signal light. The optical transmission device 100 may include an optical amplifier 121 that amplifies output uplink signal light output from the signal light monitor 123. The optical amplifier 121 may amplify an input uplink optical signal, and outputs the amplified signal to another optical transmission device. However, the optical amplifier 121 is not an essential element in the optical transmission device 100. Further, the monitoring light monitor 125 outputs, to the control unit 180, an electrical signal of an amplitude proportional to an intensity of uplink monitoring light received by the optical transmission device 100.

The control unit 180 determines a reception state of uplink signal light and uplink monitoring light, based on an amplitude of an electrical signal input from the signal light monitor 123 and the monitoring light monitor 125, and further controls the optical amplifier 111 and the optical switch 113, based on these determination results.

Each constituent element of the optical transmission device 100 can be described as follows. Specifically, the optical amplifier 111 serves as an optical amplifying means that amplifies first signal light (downlink signal light). The optical switch 113 serves as a monitoring light generation means that generates first monitoring light (downlink monitoring light). The optical multiplexer 114 serves as an optical multiplexing means that combines an output of the optical amplifier 111 and an output of the optical switch 113, and outputs the combined output to the first optical transmission path (optical transmission path 20).

Further, the optical demultiplexer 122 serves as an optical demultiplexing means that separates light including second signal light (uplink signal light) and second monitoring light (uplink monitoring light) input from the second optical transmission path (optical transmission path 30) into second signal light and second monitoring light. Further, the control unit 180 serves as a control means that controls an optical amplifying means (optical amplifier 111) and a monitoring light generation means (optical switch 113), based on a reception state of second signal light (uplink signal light), and a duration time of light emission and light weakening of second monitoring light (uplink monitoring light).

The optical transmission device 200 includes a configuration similar to that of the optical transmission device 100. Specifically, the optical amplifier 211 amplifies signal light (hereinafter, referred to as "uplink signal light") to be transmitted from the optical transmission device 200 to the optical transmission device 100. Uplink signal light is an optical signal including user data. The light source 212 is a light source of monitoring light (hereinafter, referred to as "uplink monitoring light") to be transmitted from the optical transmission device 200 to the optical transmission device 100. A wavelength of the light source 212 does not overlap a wavelength of uplink signal light. The light source 212 may be provided outside of the optical transmission device 200. The optical switch 213 transmits light generated in the light source 212 for a predetermined period, or blocks the light for a predetermined period. An optical modulator may be used in place of the optical switch 213. Light transmitted through the optical switch 213 is input to the optical multiplexer 214, as uplink monitoring light. The optical switch 213 is able to generate uplink monitoring light, as continuous light or pulsed light, based on control of the control unit 280.

The optical multiplexer 214 multiplexes uplink signal light to be output from the optical amplifier 211, and uplink monitoring light to be output from the optical switch 213, and sends the multiplexed light to the optical transmission path 30. Since a wavelength of uplink signal light and a wavelength of uplink monitoring light are different from each other, a WDM filter can be used as the optical multiplexer 214.

The optical demultiplexer 222 demultiplexes downlink signal light and downlink monitoring light transmitted from the optical transmission device 100. Since a wavelength of downlink signal light and a wavelength of downlink monitoring light are different from each other, a WDM filter can be used as the optical demultiplexer 222. Downlink signal light separated by the optical demultiplexer 222 is input to the signal light monitor 223, and separated monitoring light is input to the monitoring light monitor 225.

The signal light monitor 223 outputs, to the control unit 280, a reception state of downlink signal light in the optical transmission device 200. The monitoring light monitor 225 outputs, to the control unit 280, a reception state of downlink monitoring light in the optical transmission device 200. Each of the signal light monitor 223 and the monitoring light monitor 225 includes a PD. The signal light monitor 223 outputs downlink signal light received by the optical transmission device 200, and outputs, to the control unit 280, an electrical signal of an amplitude proportional to an intensity of downlink signal light. The optical transmission device 200 may include an optical amplifier 221 that amplifies downlink signal light output from the signal light monitor 223. The optical amplifier 221 may amplify an input downlink optical signal, and outputs the amplified signal to another optical transmission device. However, the optical amplifier 221 is not an essential element in the optical transmission device 200. Further, the monitoring light monitor 225 outputs, to the control unit 280, an electrical signal of an amplitude proportional to an intensity of downlink monitoring light received by the optical transmission device 200.

The control unit 280 determines a reception state of downlink signal light and downlink monitoring light, based on an amplitude of an electrical signal input from the signal light monitor 223 and the monitoring light monitor 225, and further controls the optical amplifier 211 and the optical switch 213, based on the determination result.

Figure 2:
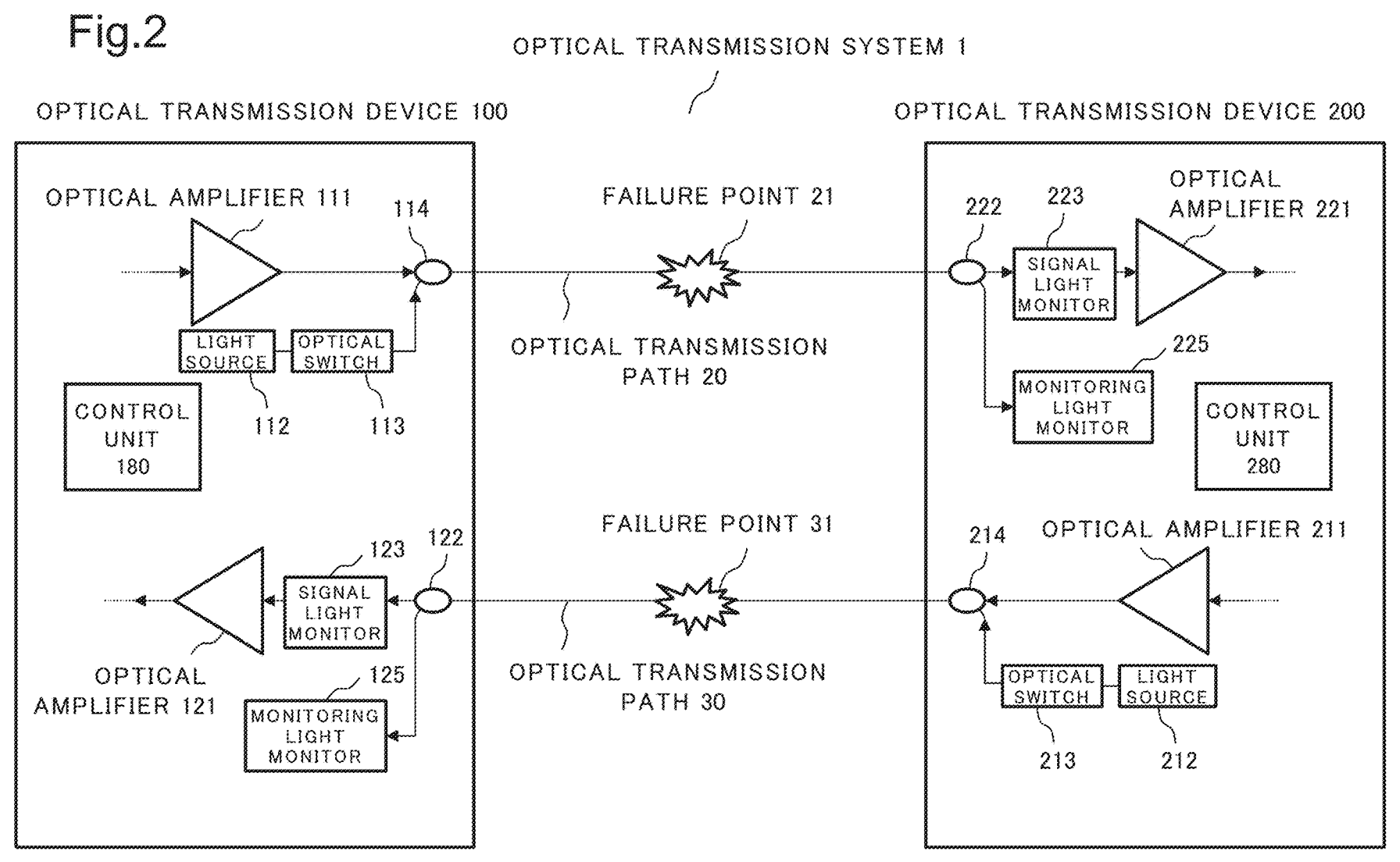

FIG. 2 is a diagram illustrating an example of a bi-directional failure in the optical transmission system 1. An example of APR control in a case where a failure has occurred in an optical fiber at both of a failure point 21 of the optical transmission path 20, and a failure point 31 of the optical transmission path 30 is described with reference to FIG. 2.

(1-1) The control unit 180 of the optical transmission device 100 and the control unit 280 of the optical transmission device 200 respectively control the optical switch 113 and the optical switch 213 in such a way that both of downlink monitoring light and uplink monitoring light become continuous light in a normal state before occurrence of a failure. Further, in the optical transmission device that receives monitoring light, in a case where the received monitoring light is continuous light, the optical transmission path is determined to be normal, and in a case where the received monitoring light is in an input disconnected state or is pulsed light, the optical transmission path is determined to have a failure. Since downlink monitoring light does not pass through the optical amplifier 111, the light is input to the optical transmission path 20, even when an optical output of the optical amplifier 111 is stopped.

(1-2) In the optical transmission device 100, when input disconnection of uplink signal light and uplink monitoring light is detected due to a failure at the failure point 31, the control unit 180 stops (shuts down) an optical output of the optical amplifier 111, and changes an downlink monitoring light from continuous light to pulsed light. Since downlink monitoring light does not pass through the optical amplifier 111, the light is output to the optical transmission path 20, even when the optical amplifier 111 is shut down. However, neither downlink signal light nor downlink monitoring light is received in the optical transmission device 200 due to a failure at the failure point 21.

(1-3) Likewise, in the optical transmission device 200, when input disconnection of downlink signal light and downlink monitoring light is detected due to a failure at the failure point 21, the control unit 280 shuts down the optical amplifier 211, and changes uplink monitoring light from continuous light to pulsed light. Uplink monitoring light is output to the optical transmission path 30, even when the optical amplifier 211 is shut down. However, neither uplink signal light nor uplink monitoring light is received in the optical transmission device 100 due to a failure of the optical transmission path 30.

In this way, in a case where a failure has occurred in both of the optical transmission paths 20 and 30, APR control is performed by automatically stopping an output of signal light from the optical transmission devices 100 and 200 at both ends.

Next, a case where a failure of the optical transmission paths 20 and 30 is recovered is described.

(1-4) At a time immediately after a failure of the optical transmission paths 20 and 30 is recovered, while uplink signal light is kept in a disconnected state in the signal light monitor 123 of the optical transmission device 100, uplink monitoring light of pulsed light is input to the monitoring light monitor 125. The control unit 180 determines a time from an off-state to an on-state (from light weakening to light emission) of uplink monitoring light, and a time from an on-state to an off-state (from light emission to light weakening), and when reception of a first pulse of uplink monitoring light is confirmed, the control unit 180 changes downlink monitoring light from pulsed light to continuous light. When the optical transmission device 200 confirms that downlink monitoring light is changed from pulsed light to continuous light on the monitoring light monitor 225, the optical transmission device 200 determines that the optical transmission path 30 becomes normal, and automatically cancels shutdown of the optical amplifier 211. Note that, power of uplink monitoring light at a light emission time and power of uplink monitoring light at a light weakening time in an output of the optical transmission device 200 may be defined as power capable of discriminating "light emission" and "light weakening", when uplink monitoring light is received in the optical transmission device 100. Likewise, power of downlink monitoring light at a light emission time and power of downlink monitoring light at a light weakening time in an output of the optical transmission device 100 may be defined as power capable of discriminating "light emission" and "light weakening", when downlink monitoring light is received in the optical transmission device 200.

(1-5) Likewise, at a time immediately after a failure of the optical transmission paths 20 and 30 is recovered, while downlink signal light is kept in a disconnected state in the signal light monitor 223 of the optical transmission device 200, downlink monitoring light of pulsed light is input to the monitoring light monitor 225. The control unit 280 determines a time from an on-state to an off-state of downlink monitoring light, and a time from an on-state to an off-state, and when reception of a first pulse of downlink monitoring light is confirmed, the control unit 280 changes uplink monitoring light from pulsed light to continuous light. When the optical transmission device 100 confirms that uplink monitoring light is changed from pulsed light to continuous light on the monitoring light monitor 125, the optical transmission device 100 determines that the optical transmission path 20 becomes normal, and automatically cancels shutdown of the optical amplifier 111.

In this way, when a failure of the optical transmission paths 20 and 30 is recovered, the optical transmission devices 100 and 200 at both ends are able to automatically cancel shutdown of the optical amplifiers 111 and 211.

Specifically, according to the above-described procedure, the optical transmission devices 100 and 200 are able to perform and cancel APR control with a simple configuration, without the need of an encoding circuit and a decoding circuit of a monitoring control signal.

Second Example Embodiment

In a second example embodiment, an example of APR control and recovery thereof in a case where a bi-directional failure has occurred is described in detail. FIG. 3 is a block diagram illustrating an example of a detailed configuration of the optical transmission devices 100 and 200 described in FIGS. 1 and 2. A control unit 180 of the optical transmission device 100 described in FIG. 1 includes a signal light detection circuit 124, a monitoring light detection circuit 126, a monitoring light determination circuit 127, a monitoring light output determination circuit 131, a signal light output determination circuit 132, an optical switch control circuit 133, and an optical amplifier control circuit 134. These circuits included in the control unit 180 may be achieved by an electrical circuit.

The signal light detection circuit 124 determines whether signal light is received from an optical transmission path 30, based on an intensity of uplink signal light detected by a signal light monitor 123. The monitoring light detection circuit 126 determines whether monitoring light is received from the optical transmission path 30, based on an intensity of uplink monitoring light detected by a monitoring light monitor 125. A determination result in the signal light detection circuit 124 and the monitoring light detection circuit 126 is output to both of the monitoring light output determination circuit 131 and the signal light output determination circuit 132. Further, the monitoring light detection circuit 126 acquires a light emission time and a light weakening time of uplink monitoring light, based on a change of an intensity of uplink monitoring light with time. An acquisition result on a light emission time and a light weakening time of uplink monitoring light is output to the monitoring light determination circuit 127.

The monitoring light determination circuit 127 determines whether uplink monitoring light is continuous light or pulsed light, based on a light emission time and a light weakening time of the uplink monitoring light, and outputs the result to the monitoring light output determination circuit 131.

The monitoring light output determination circuit 131 determines whether monitoring light to be sent to an optical transmission path 20 by the optical transmission device 100 is continuous light or pulsed light, based on an input from the signal light detection circuit 124, the monitoring light detection circuit 126, and the monitoring light determination circuit 127. The signal light output determination circuit 132 determines whether an optical amplifier 111 is to be operated normally or stopped (shut down), based on an input from the signal light detection circuit 124 and the monitoring light detection circuit 126.

The optical switch control circuit 133 controls an optical switch 113, based on a determination result of the monitoring light output determination circuit 131. The optical amplifier control circuit 134 operates or shuts down the optical amplifier 111, based on a determination result of the signal light output determination circuit 132.

A control unit 280 of the optical transmission device 200 includes a signal light detection circuit 224, a monitoring light detection circuit 226, a monitoring light determination circuit 227, a monitoring light output determination circuit 231, a signal light output determination circuit 232, an optical switch control circuit 233, and an optical amplifier control circuit 234. A configuration of the control unit 280 is similar to that of the control unit 180. In the optical transmission device 200, since a block having the same name as that of the optical transmission device 100 includes an associated function also in the optical transmission device 200, detailed description of the control unit 280 is omitted.

In FIG. 3, a failure position of the optical transmission path 20 is denoted by a failure point 21, and a failure position of the optical transmission path 30 is denoted by a failure point 31. An optical signal propagating through each of the optical transmission paths 20 and 30 is disconnected at the failure points 21 and 31. Hereinafter, APR control in a case where a transmission path failure has occurred is described with reference to timing charts.

Figure 4:
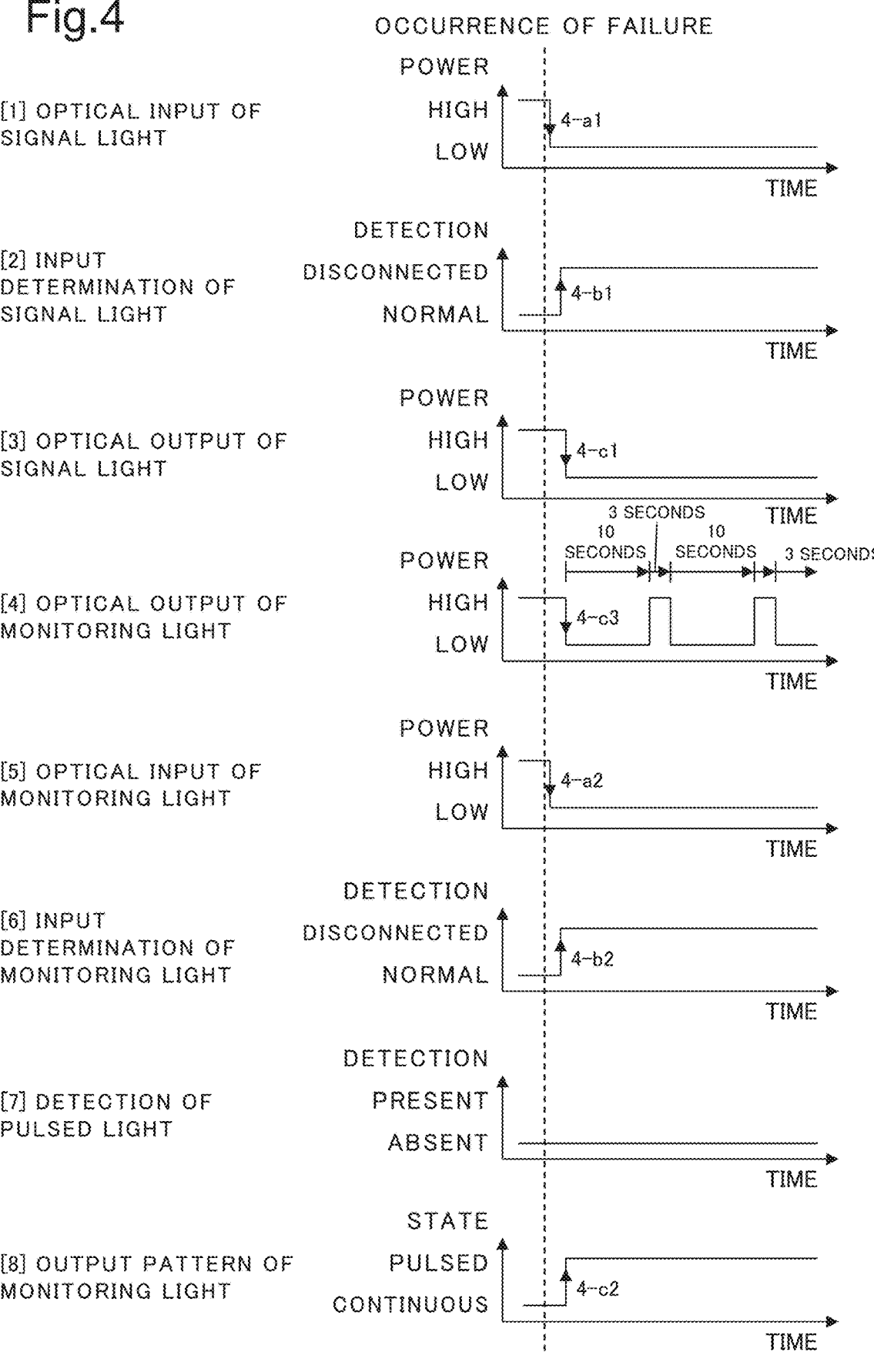
FIG. 4 is a timing chart illustrating an example of APR control at a time of occurrence of a bi-directional failure.
Figure 5:
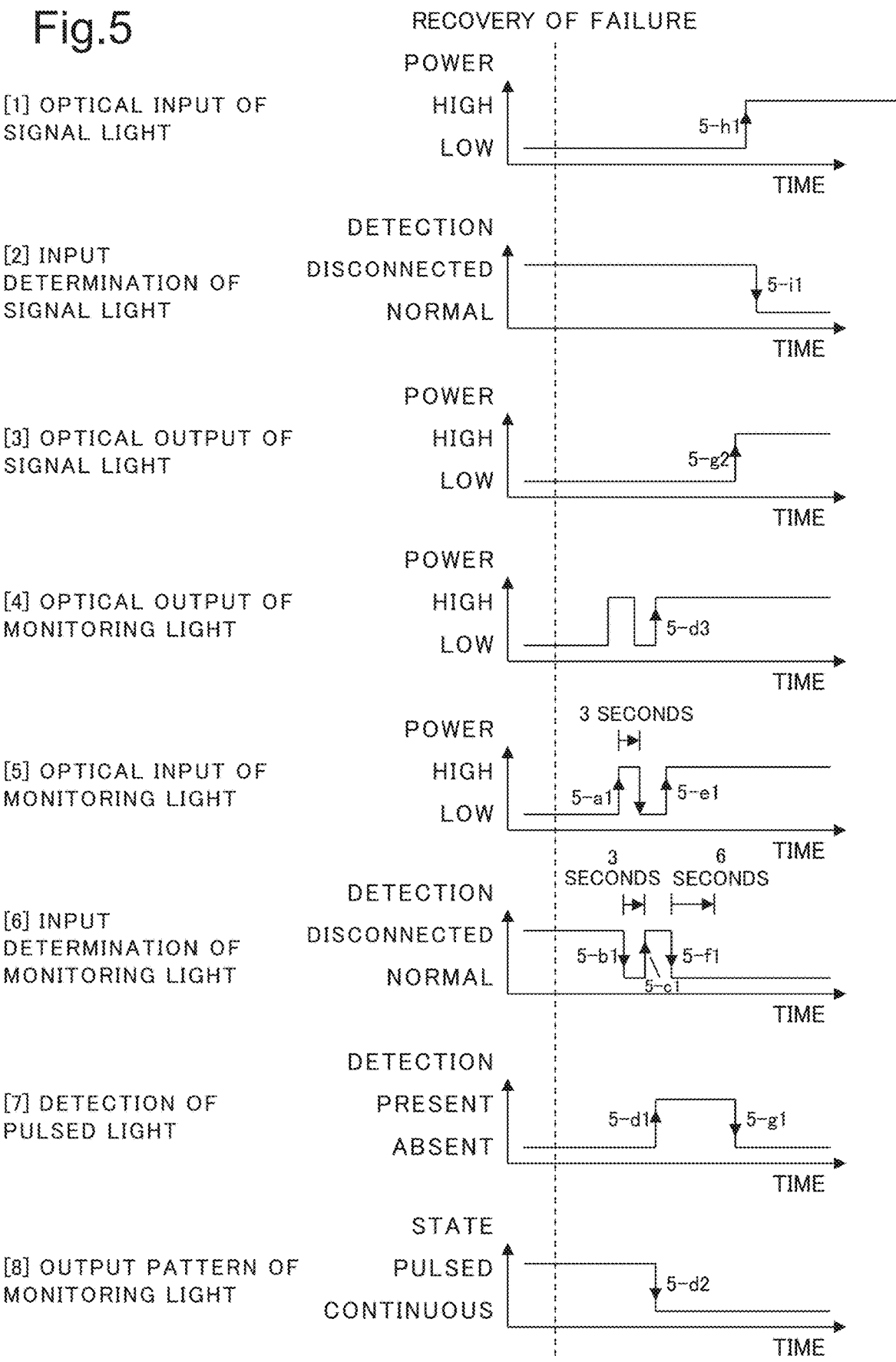
FIG. 5 is a timing chart illustrating an example of APR control at a recovery time of a bi-directional failure.

FIGS. 4 and 5 are timing charts illustrating an example of APR control of each unit in the optical transmission devices 100 and 200 at a time of occurrence of a bi-directional failure. In these timing charts, a horizontal axis denotes a time, and a vertical axis denotes a state of each unit of the optical transmission devices 100 and 200. A vertical dashed line denotes a time of occurrence or recovery of a failure. Specifically, these timing charts indicate a change of a state of each unit in the optical transmission devices 100 and 200 with time after occurrence or recovery of a failure at the failure points 21 and 31.

Referring to the optical transmission device 100 as an example, in FIGS. 4 and 5, "[1] optical input of signal light" indicates power of input light to the signal light monitor 123 in FIG. 3. "[2] input determination of signal light" indicates a determination result (normal or disconnected) as to whether an input of signal light is present in the signal light detection circuit 124. "[3] optical output of signal light" indicates power of output light of the optical amplifier 111. "[4] optical output of monitoring light" indicates power of output light of the optical switch 113. "[5] optical input of monitoring light" indicates power of input light of the monitoring light monitor 125. "[6] input determination of monitoring light" indicates a determination result (normal or disconnected) as to whether an input of monitoring light is present in the monitoring light detection circuit 126. "[7] detection of pulsed light" indicates a detection result (presence or absence of pulsed light) on pulsed light in the monitoring light determination circuit 127. "[8] output pattern of monitoring light" indicates a determination result as to which one of continuous light or pulsed light is output in the monitoring light output determination circuit 131.

Note that, each item illustrated in [1] to [8] in FIGS. 7 to 10 to be described later also indicates a similar content. Further, since a function of each unit of the optical transmission device 100 is also similar to that of the optical transmission device 200, hereinafter, these timing charts are used also when an operation of the optical transmission device 200 is described.

Further, FIG. 11 illustrates an example of an operation in APR control, and a condition in which the operation is performed. FIG. 12 illustrates an output pattern of monitoring light, and an operation example of the optical switch 113 and an optical switch 213. FIG. 13 illustrates an example of a determination condition as to whether received monitoring light in the monitoring light determination circuit 127 is continuous light or pulsed light. The control units 180 and 280 may include a storage unit, and an operation and a condition in FIGS. 11 to 13 may be stored as data in the storage unit. Data in the storage unit are referred to from a circuit of each unit of the optical transmission devices 100 and 200.

(2-1) Operation at Time of Occurrence of Bi-directional Failure

In a case where there is no failure in the optical transmission paths 20 and 30, the optical amplifier 111 and an optical amplifier 211 are operated normally, and both of downlink monitoring light and uplink monitoring light are continuous light. In this state, when a failure occurs at the failure point 31, in the optical transmission device 100, input power of uplink signal light to be input to the signal light monitor 123 is lowered (4-*a*1 in FIG. 4). Consequently, the signal light detection circuit 124 detects input disconnection of uplink signal light (4-*b*1). Further, since input power of uplink monitoring light to be input to the monitoring light monitor 125 is also lowered (4-*a*2), the monitoring light detection circuit 126 detects input disconnection of uplink monitoring light (4-*b*2). These detection results are notified to the monitoring light output determination circuit 131 and the signal light output determination circuit 132.

When detection of input disconnection of uplink signal light and uplink monitoring light is notified, the signal light output determination circuit 132 determines to shut down the optical amplifier 111 by a condition 501 in FIG. 11. Then, the signal light output determination circuit 132 outputs, to the optical amplifier control circuit 134, an instruction to shut down the optical amplifier 111. The optical amplifier control circuit 134 shuts down the optical amplifier 111, based on this instruction (4-*c*1). The optical amplifier control circuit 134 may shut down the optical amplifier 111 by stopping supply of excitation light to the optical amplifier 111.

Further, the monitoring light output determination circuit 131 determines in such a way as to set downlink monitoring light, as pulsed light by a condition 503 in FIG. 11. The monitoring light output determination circuit 131 outputs, to the optical switch control circuit 133, an instruction to set downlink monitoring light, as pulsed light (4-*c*2). The optical switch control circuit 133 controls the optical switch 113 to set downlink monitoring light, as pulsed light in response to this instruction (4-*c*3). Pulsed light is an optical pulse train having a predetermined light emission time and a predetermined light weakening time. In the present example embodiment, pulsed light is weakened for first ten seconds, and thereafter, repeats light emission for three seconds and light weakening for ten seconds (condition 602 in FIG. 12).

Pulsed light (downlink monitoring light) output from the optical switch 113 is input to an optical multiplexer 114. Since downlink monitoring light does not pass through the optical amplifier 111, the downlink monitoring light is sent to the optical transmission path 20 via the optical multiplexer 114, even when the optical amplifier 111 is in a shutdown state. However, since the optical transmission path 20 is disconnected by a failure, the downlink monitoring light does not reach the optical transmission device 200.

On the other hand, the optical transmission device 200 is also operated similarly to the optical transmission device 100 due to a failure at the failure point 21. Specifically, in the optical transmission device 200, input disconnection of downlink signal light and input disconnection of downlink monitoring light are notified to the monitoring light output determination circuit 231 and the signal light output determination circuit 232. The signal light output determination circuit 232 outputs, to the optical amplifier control circuit 234, an instruction to shut down the optical amplifier 211. The optical amplifier control circuit 234 shuts down the optical amplifier 211 in response to this instruction.

Further, the monitoring light output determination circuit 231 outputs, to the optical switch control circuit 233, an instruction to set downlink monitoring light, as pulsed light. The optical switch control circuit 233 controls the optical switch 213 in such a way that uplink monitoring light becomes pulsed light that satisfies the condition 602 in FIG. 12 in response to this instruction.

By the foregoing operation, when a failure occurs in the optical transmission paths 20 and 30, the optical transmission devices 100 and 200 shut down the optical amplifiers 111 and 211. In other words, APR control is performed in an optical transmission system 1.

(2-2) Operation at Recovery Time of Bi-Directional Failure

An operation of recovery (APR recovery) of APR control of the optical transmission device 100 after a failure of the optical transmission paths 20 and 30 is recovered is described. At a time immediately after a failure of the optical transmission paths 20 and 30 is recovered, the optical amplifiers 111 and 211 are in a shutdown state. Therefore, uplink signal light is not detected in the signal light monitor 123 of the optical transmission device 100. However, in the monitoring light monitor 125, uplink monitoring light is detected as light whose intensity changes in a pulse form (5-*a*1, 5-*b*1, and 5-*c*1 in FIG. 5). The monitoring light determination circuit 127 detects a light emission time and a light weakening time of pulsed light received by the monitoring light monitor 125, and outputs a detection result thereof to the monitoring light output determination circuit 131. The monitoring light output determination circuit 131 controls the optical switch 113, based on input information and conditions in FIGS. 11 to 12. Specifically, the monitoring light determination circuit 127 detects reception of a first pulse of pulsed light in a state that the pulsed light is not received (5-*d*1). This detection result is notified to the monitoring light output determination circuit 131. When reception of the first pulse is notified, the monitoring light output determination circuit 131 outputs, to the optical switch control circuit 133, an instruction to change downlink monitoring light from pulsed light to continuous light by a condition 504 in FIG. 11 (5-*d*2). Consequently, downlink monitoring light changes from pulsed light to continuous light (5-*d*3).

Next, an APR recovery operation of the optical transmission device 200 is described. FIG. 5 is used also for describing the optical transmission device 200. By the above-described APR recovery operation of the optical transmission device 100, downlink monitoring light to be received in the optical transmission device 200 is changed from pulsed light to continuous light. Therefore, monitoring light to be input to the monitoring light monitor 225 of the optical transmission device 200 is changed from pulsed light to continuous light (5-*e*1 and 5-*f*1 in FIG. 5). Since a light emission time of pulsed light is three seconds, the monitoring light determination circuit 227 detects that continuous light is continued for six seconds or longer. Since this satisfies a condition 701 in FIG. 13, the monitoring light determination circuit 227 notifies the signal light output determination circuit 232 that monitoring light has changed from pulsed light to continuous light (5-*g*1). The signal light output determination circuit 232 outputs, to the optical amplifier control circuit 234, an instruction to cancel stopping of the optical amplifier 211 by a condition 502 in FIG. 11. Consequently, uplink signal light is transmitted from the optical transmission device 200 to the optical transmission device 100 via the optical transmission path 30.

On the other hand, at a time immediately after a failure of the optical transmission paths 20 and 30 is recovered, in the optical transmission device 200, downlink signal light is not received, and reception of only downlink monitoring light being pulsed light is started. Therefore, similarly to the optical transmission device 100, the optical transmission device 200 changes uplink monitoring light from pulsed light to continuous light. Consequently, monitoring light to be input to the monitoring light monitor 125 of the optical transmission device 100 is also changed from pulsed light to continuous light. Then, also in the optical transmission device 100, when it is detected that continuous light is continued for six seconds or longer, stopping of the optical amplifier 111 is cancelled by the condition 502 in FIG. 11.

By the foregoing operation, in the optical transmission devices 100 and 200, when a failure of the optical transmission paths 20 and 30 is recovered, shutdown of the optical amplifiers 111 and 211 is automatically cancelled. This allows recovery of APR control of the optical transmission system 1, and communication of the optical transmission system 1 is resumed.

As described above, the optical transmission system 1 according to the present example embodiment is able to achieve an APR control function of the optical transmission system with a simple configuration, in a case where a bi-directional failure has occurred.

Third Example Embodiment

Figure 6:
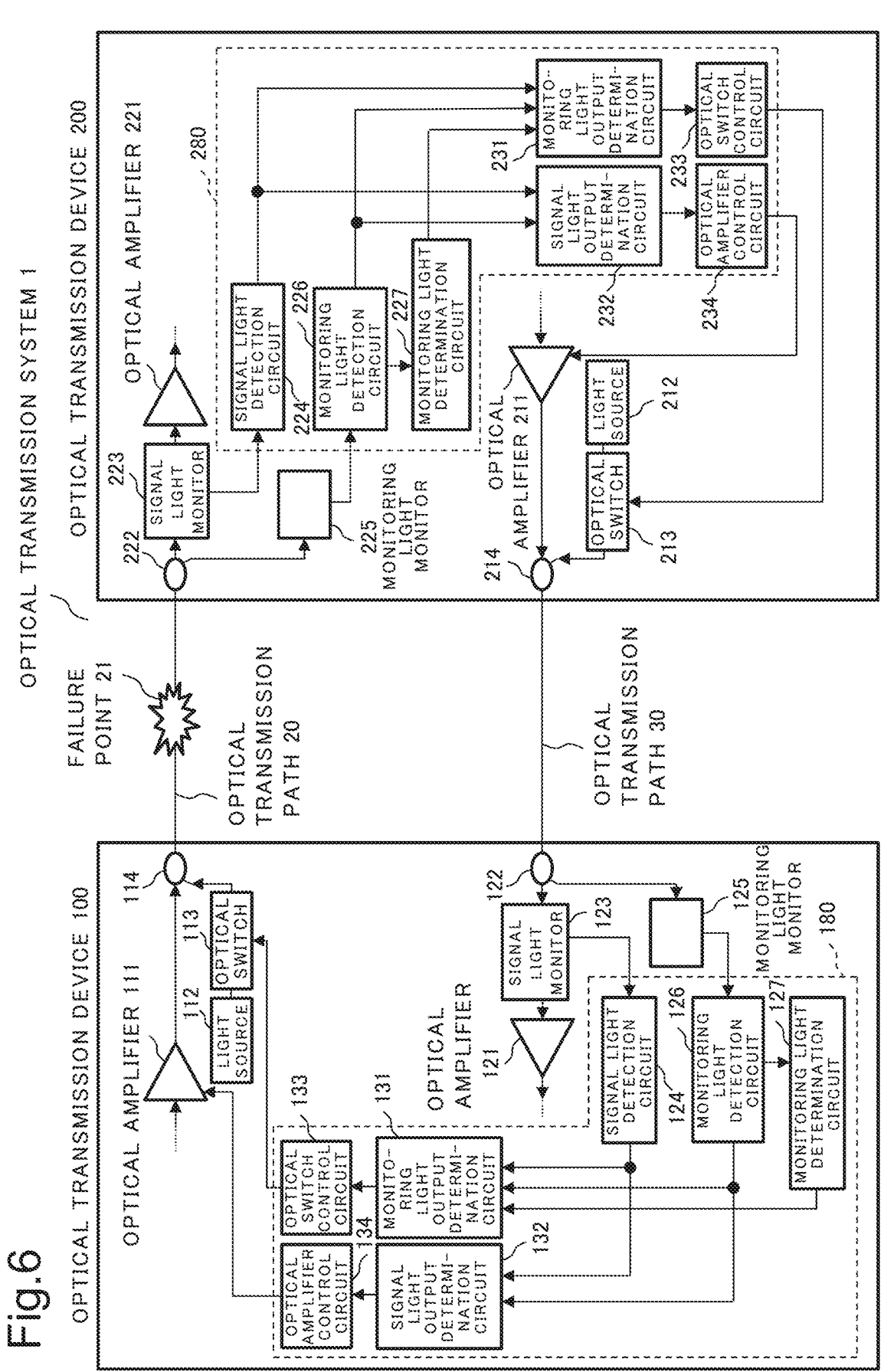
FIG. 6 is a diagram illustrating a one-directional failure of the optical transmission system 1.

In a third example embodiment, an example of APR control in a case where a one-directional failure has occurred is described in detail. FIG. 6 is a diagram illustrating an example of a one-directional failure of an optical transmission system 1. FIG. 6 illustrates that a failure occurs at a failure point 21 of an optical transmission path 20, and a failure does not occur in an optical transmission path 30. Specifically, although downlink monitoring light and downlink signal light propagating through the optical transmission path 20 are blocked at the failure point 21, uplink monitoring light and uplink signal light propagate through the optical transmission path 30, and reach an optical transmission device 100. Hereinafter, APR control in a one-directional failure as described above is described.

Figure 7:
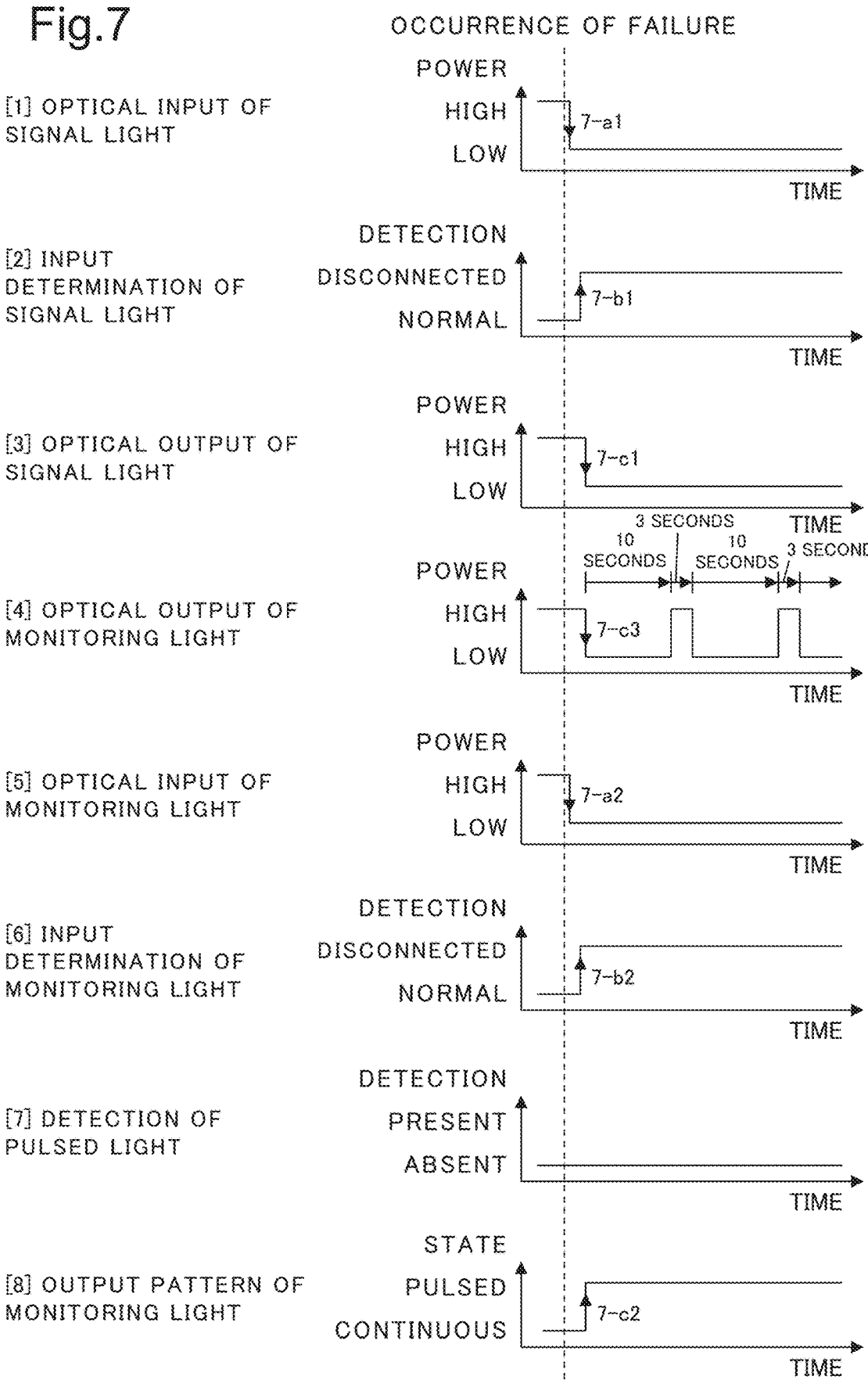
FIG. 7 is a timing chart illustrating an example of APR control at a time of occurrence of a one-directional failure.
Figure 8:
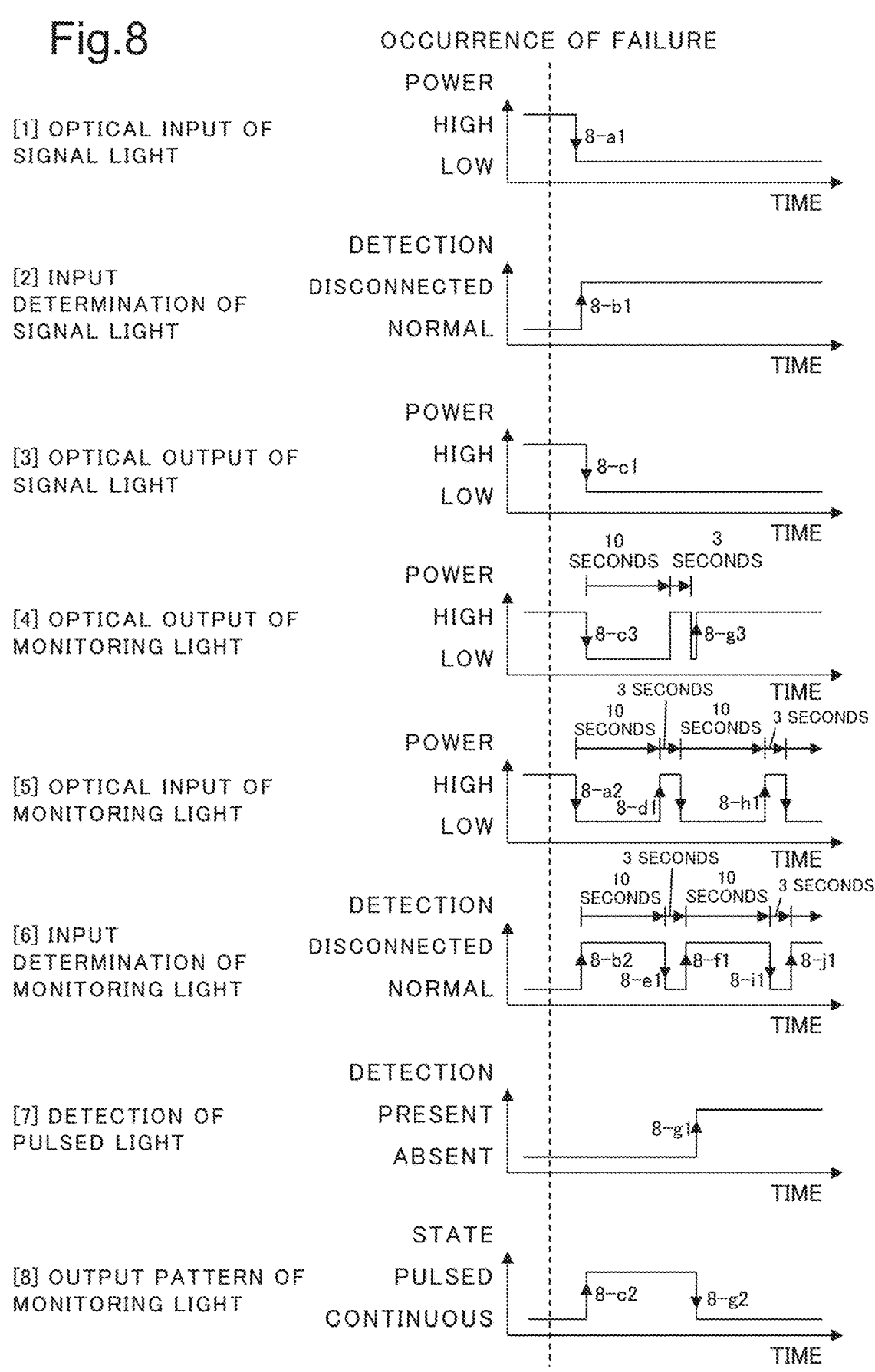
FIG. 8 is a timing chart illustrating an example of APR control at a time of occurrence of a one-directional failure.
Figure 9:
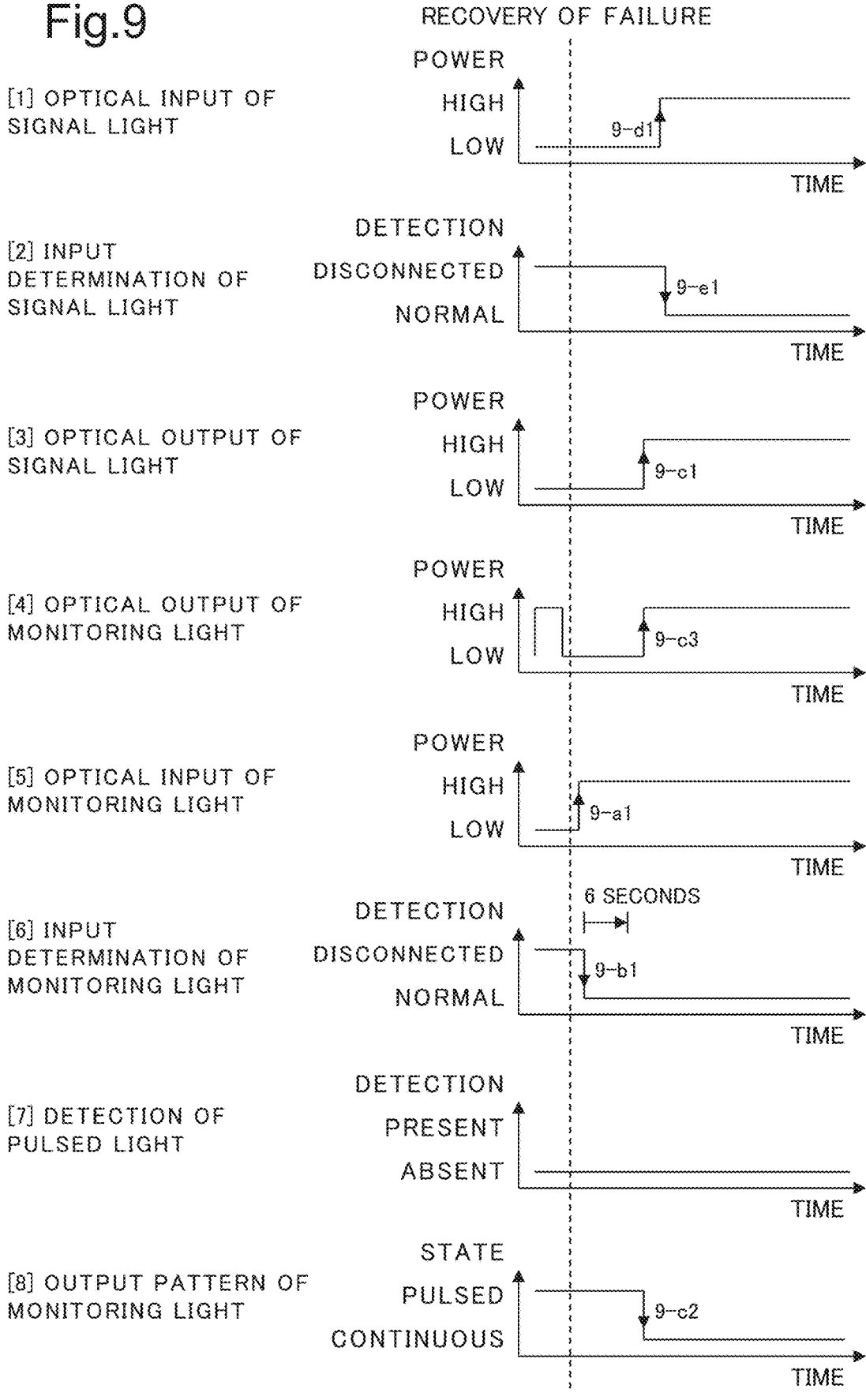
FIG. 9 is a timing chart illustrating an example of APR control at a recovery time of a one-directional failure.
Figure 10:
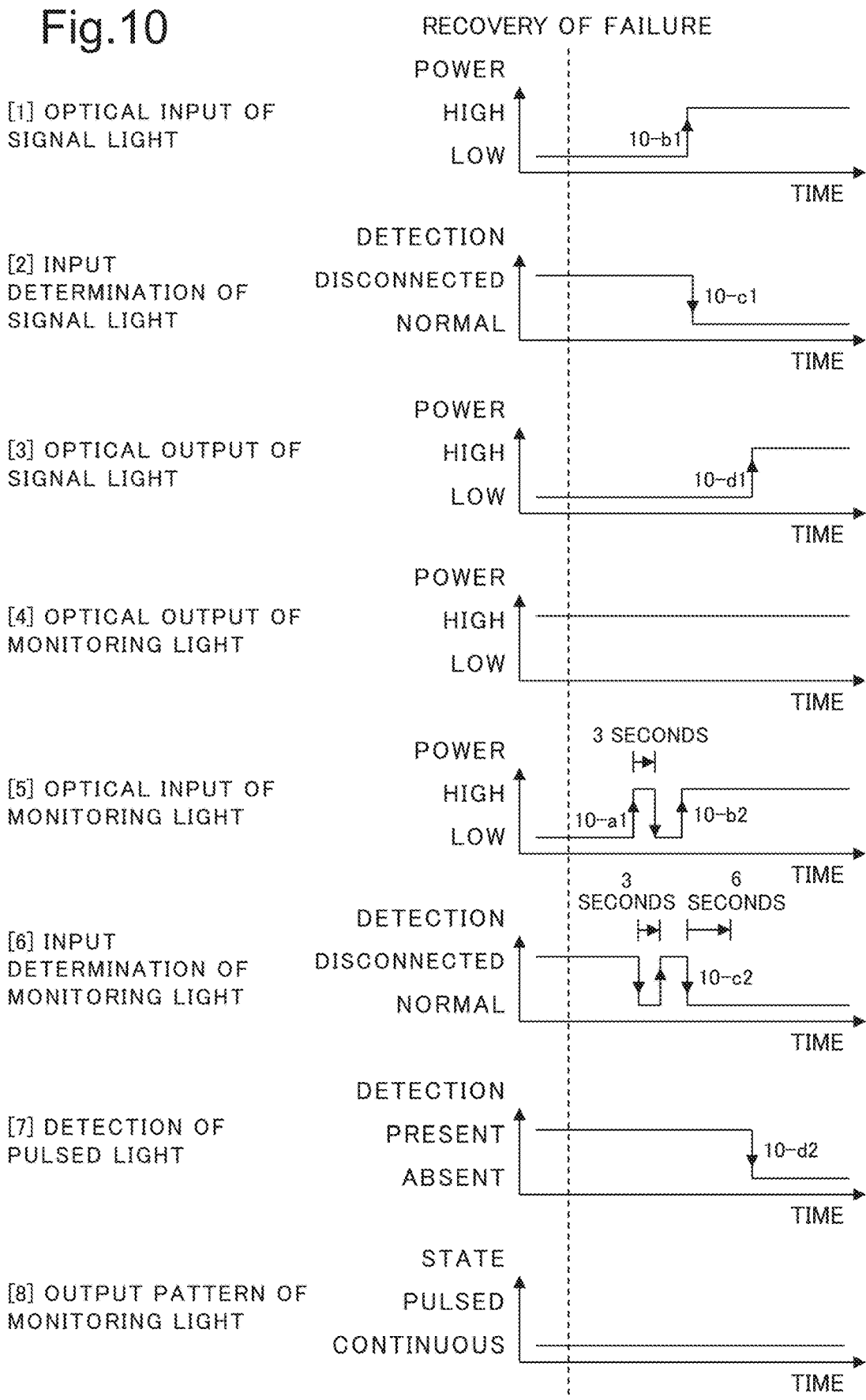
FIG. 10 is a timing chart illustrating an example of APR control at a recovery time of a one-directional failure.

FIGS. 7 to 10 are timing charts illustrating an example of APR control of the optical transmission device 100 or an optical transmission device 200 at a time of occurrence of a one-directional failure. FIG. 7 is a diagram illustrating APR control in the optical transmission device 200 at a time of occurrence of a one-directional failure at the failure point 21. FIG. 8 is a diagram illustrating APR control in the optical transmission device 100 at a time of occurrence of a one-directional failure at the failure point 21. FIG. 9 is a diagram illustrating APR control in the optical transmission device 200 at a recovery time of a one-directional failure. FIG. 10 is a diagram illustrating APR control in the optical transmission device 100 at a recovery time of a one-directional failure. A content illustrated in [1] to [8] in FIGS. 7 to 10 is in accordance with that in FIGS. 4 to 5.

(3-1) Operation at Time of Occurrence of One-directional Failure

When a failure occurs at the failure point 21, in the optical transmission device 200, power of downlink signal light is lowered (7-a1 in FIG. 7), and power of downlink monitoring light is also lowered (7-a2). Therefore, a monitoring light detection circuit 226 and a signal light detection circuit 224 respectively detect input disconnection of downlink signal light and input disconnection of downlink monitoring light (7-b1 and 7-b2). These detection results are notified to a monitoring light output determination circuit 231 and a signal light output determination circuit 232.

When detection of input disconnection of downlink signal light and downlink monitoring light is notified, the signal light output determination circuit 232 determines to shut down an optical amplifier 211 by the condition 501 in FIG. 11. Further, the monitoring light output determination circuit 231 determines to set uplink monitoring light, as pulsed light by the condition 503 in FIG. 11. Also in the present example embodiment, pulsed light is weakened for first ten seconds, and thereafter, repeats light emission for three seconds and light weakening for ten seconds. An operation and a condition in FIGS. 11 to 13 are set in advance as data in a storage unit included in a control unit 280.

The signal light output determination circuit 232 outputs, to an optical amplifier control circuit 234, an instruction to shut down the optical amplifier 211. The optical amplifier control circuit 234 shuts down the optical amplifier 211 in response to this instruction (7-c1).

Further, the monitoring light output determination circuit 231 outputs, to an optical switch control circuit 233, an instruction to set downlink monitoring light, as pulsed light (7-c2). The optical switch control circuit 233 controls an optical switch 213 in such a way as to set uplink monitoring light, as pulsed light in response to this instruction (7-c3).

Pulsed light (uplink monitoring light) output from the optical switch 213 is input to an optical multiplexer 214. Since uplink monitoring light does not pass through the optical amplifier 211, the uplink monitoring light is sent to the optical transmission path 30 via the optical multiplexer 214, even when the optical amplifier 211 is in a stop state. Since a failure has not occurred in the optical transmission path 30, the optical transmission device 100 does not receive uplink signal light, and receives uplink monitoring light being pulsed light.

Referring to FIG. 8, in the optical transmission device 100, power of uplink signal light is lowered (8-a1 in FIG. 8), and uplink monitoring light being pulsed light is received (8-a2). Therefore, the signal light detection circuit 124 detects input disconnection of uplink monitoring light (8-b1). These detection results are notified to the monitoring light output determination circuit 231 and the signal light output determination circuit 232.

Since power of uplink monitoring light is lowered during a time when pulsed light is weakened, it is determined that monitoring light is disconnected (8-b2). Therefore, when detection of input disconnection of uplink signal light and uplink monitoring light is notified, the signal light output determination circuit 132 and the optical amplifier control circuit 134 shut down the optical amplifier 111 by the condition 501 in FIG. 11 (8-c1). Further, the monitoring light output determination circuit 131 and the optical switch control circuit 133 set downlink monitoring light, as pulsed light by the condition 503 in FIG. 11 (8-c2).

On the other hand, since the optical transmission path 30 is normal, a first pulse of uplink monitoring light reaches from the optical transmission device 200 (8-d1). In a case where uplink monitoring light is pulsed light, since a light emission time of monitoring light is three seconds (8-e1 to 8-f1), the monitoring light determination circuit 127 determines that uplink monitoring light is pulsed light by a condition 702 in FIG. 13 (8-g1). Then, downlink monitoring light to be sent from the optical transmission device 100 is changed from pulsed light to continuous light by the condition 504 in FIG. 11 (8-g2 to 8-g3).

Note that, an input of uplink monitoring light is temporarily disconnected due to light weakening of a first pulse of uplink monitoring light (8-f1). However, determination on reception of pulsed light at 8-g1 in FIG. 8 is maintained by the condition 702 in FIG. 13. Therefore, the condition 503 in FIG. 11 is not applied, and determination that downlink monitoring light is continuous light is maintained. Further, when a second pulse of pulsed light is received (8-h1), a state that monitoring light is normal is continued again for three seconds (8-i1 to 8-j1). However, since this pulse is a second pulse that follows a first pulse, the state does not satisfy the condition 504 in FIG. 11.

By the foregoing operation, the optical transmission devices 100 and 200 shut down the optical amplifiers 111 and 211, even in a case where a failure has occurred only in either of the optical transmission paths 20 and 30. In other words, APR control is performed in the optical transmission system 1.

(3-2) Operation at Recovery Time of One-directional Failure

A recovery procedure (APR recovery procedure) of APR control due to a one-directional failure is described. First, an APR recovery procedure of the optical transmission device 200 is described. As described above, after occurrence of a failure at the failure point 21, downlink monitoring light becomes continuous light (8-g3 in FIG. 8). Therefore, when a failure at the failure point 21 is recovered, a monitoring light monitor 225 of the optical transmission device 200 receives downlink monitoring light being continuous light (9-a1 in FIG. 9). Then, the monitoring light detection circuit 226 determines that monitoring light is normally received (9-b1). When continuous light is received for six seconds, shutdown of the optical amplifier 211 is cancelled by the condition 502 in FIG. 11 (8-c1), and uplink monitoring light is changed from pulsed light to continuous light (9-c2 and 9-c3). As will be described later, since this allows to cancel shutdown of the optical amplifier 111 of the optical transmission device 100, downlink signal light is received in a signal light monitor 223 (9-d1), and it is determined that downlink signal light has been received normally (9-e1).

Next, an APR recovery operation of the optical transmission device 100 is described with reference to FIG. 10. At a time immediately after a failure at the failure point 21 is recovered, since the optical amplifier 211 of the optical transmission device 200 is in a shutdown state, it is determined that an input of uplink signal light is disconnected. On the other hand, pulsed light is received as uplink monitoring light (10-a1 in FIG. 10). Since this state does not satisfy any of the conditions 501 to 504 in FIG. 11, the optical transmission device 100 maintains a current state.

Thereafter, since uplink signal light is received from the optical transmission device 200 (10-b1) by an APR recovery operation of the optical transmission device 200 described with reference to FIG. 9, uplink signal light is determined to be normal (10-c1). Further, as described above, in the optical transmission device 200, uplink monitoring light is changed to continuous light (9-c3 in FIG. 9). Therefore, uplink monitoring light to be received by the optical transmission device 100 is changed from pulsed light to continuous light (10-b2 in FIG. 10), and therefore, normal reception of uplink monitoring light is continued for six seconds or longer (10-c2 and thereafter). Consequently, it is determined that uplink monitoring light is not pulsed light by the condition 701 in FIG. 13 and the condition 502 in FIG. 11 (10-d2), and shutdown of the optical amplifier 111 is cancelled (10-d1).

By the foregoing operation, in the optical transmission devices 100 and 200, even in a case where a failure occurring only in either of the optical transmission paths 20 and 30 is recovered, shutdown of the optical amplifiers 111 and 211 is automatically cancelled. This allows to recover APR control of the optical transmission system 1, and communication between the optical transmission device 100 and the optical transmission device 200 is resumed.

As described above, the optical transmission system 1 according to the present example embodiment can achieve an APR control function of the optical transmission system with a simple configuration, even in a case where a one-directional failure has occurred.

While the invention has been particularly shown and described with reference to exemplary embodiments thereof, the invention is not limited to these embodiments. It will be understood by those of ordinary skill in the art that various changes in form and details may be made therein without departing from the spirt and scope of the present invention as defined by the claims.

In each example embodiment, the control units 180 and 280 may include a central processing unit (CPU). A part or all of the functions of the optical transmission devices 100 and 200 may be achieved by causing a CPU included in each of the optical transmission devices to execute a program. The program may be stored in a tangible and non-transitory recording medium. The recording medium is, for example, a non-volatile semiconductor memory, an optical disc, or a magnetic disk.

Further, a configuration described in each of the example embodiments is not necessarily and mutually exclusive. An advantageous effect of the present invention may be achieved by a configuration in which all or a part of the above-described example embodiments are combined.

REFERENCE SIGNS LIST

1 Optical transmission system
20, 30 Optical transmission path
21, 31 Failure point
100, 200 Optical transmission device
111, 121, 211, 221 Optical amplifier
112, 212 Light source
113, 213 Optical switch
114, 214 Optical multiplexer
122, 222 Optical demultiplexer
123, 223 Signal light monitor
124, 224 Signal light detection circuit
125, 225 Monitoring light monitor
126, 226 Monitoring light detection circuit
127, 227 Monitoring light determination circuit
131, 231 Monitoring light output determination circuit
132, 232 Signal light output determination circuit
133, 233 Optical switch control circuit
134, 234 Optical amplifier control circuit
180, 280 Control unit

What is claimed is:

1. An optical transmission device comprising:
an optical amplifier configured to amplify first signal light;
a monitoring light generator configured to generate first monitoring light;
an optical multiplexer configured to combine an output of the optical amplifier and an output of the monitoring light generator, and output the combined output to a first optical transmission path;
an optical demultiplexer configured to separate light input from a second optical transmission path, the light including second signal light and second monitoring light, into the second signal light and the second monitoring light; and
a controller configured to control the optical amplifier and the monitoring light generator, based on a reception state of the second signal light, and a duration time of light emission and light weakening of the second monitoring light.

2. The optical transmission device according to claim 1, wherein
the monitoring light generator generates, as the first monitoring light, continuous light, or pulsed light in which an optical output changes with time.

3. The optical transmission device according to claim 2, wherein
the monitoring light generator includes an optical modulator,
the controller includes a first monitor configured to determine presence or absence of reception of the second signal light, and a second monitor configured to acquire presence or absence of reception of the second monitoring light and acquire a duration time of light emission and light weakening of the second monitoring light, and the controller operates or stops the optical amplifier, and generates the first monitoring light, as the continuous light or the pulsed light, by controlling the optical modulator, based on a determination result of the first monitor and an acquisition result of the second monitor.

4. The optical transmission device according to claim 3, wherein the controller operates the optical amplifier, and changes the first monitoring light to the continuous light, in a case where the optical amplifier is stopped, the first monitoring light is the pulsed light, and the second monitoring light is received for a time longer than a predetermined time.

5. The optical transmission device according to claim 3, wherein the controller changes the first monitoring light to the pulsed light, in a case where neither the second signal light nor the second monitoring light is received, and the first monitoring light is the continuous light.

6. The optical transmission device according to claim 3, wherein the controller sets the first monitoring light, as the continuous light, in a case where the second monitor detects a first pulse of the second monitoring light, based on a duration time of light emission and light weakening of the second monitoring light.

7. An optical transmission system in which a first optical transmission device and a second optical transmission device are communicably connected to each other via the first optical transmission path and the second optical transmission path, wherein both of the first optical transmission device and the second optical transmission device are the optical transmission device according to claim 1.

8. An optical transmission method comprising:

amplifying first signal light;

generating first monitoring light;

combining the amplified first signal light and the first monitoring light, and outputting the combined light to a first optical transmission path;

separating light including second signal light and second monitoring light, the light being input from a second optical transmission path, into the second signal light and the second monitoring light; and controlling amplification of the first signal light and generation of the first monitoring light, based on a reception state of the second signal light, and a duration time of light emission and light weakening of the second monitoring light.

9. The optical transmission method according to claim 8, wherein the first monitoring light is continuous light, or pulsed light in which an optical output changes with time.

10. The optical transmission method according to claim 9, further comprising:

determining presence or absence of reception of the second signal light by a first monitor, acquiring presence or absence of reception of the second monitoring light and acquiring a duration time of light emission and light weakening of the second monitoring light by a second monitor, and performing or stopping amplification of the first signal light, and generating the first monitoring light, as the continuous light or the pulsed light, based on a determination result of the first monitor and an acquisition result of the second monitor.

11. The optical transmission method according to claim 10, further comprising performing amplification of the first signal light, and changing the first monitoring light to the continuous light, in a case where amplification of the first signal light is stopped, the first monitoring light is the pulsed light, and the second monitoring light is received for a time longer than a predetermined time.

12. The optical transmission method according to claim 10, further comprising changing the first monitoring light to the pulsed light, in a case where neither the second signal light nor the second monitoring light is received, and the first monitoring light is the continuous light.

13. The optical transmission method according to claim 10, further comprising setting the first monitoring light, as the continuous light, in a case where a first pulse of the second monitoring light is detected based on a duration time of light emission and light weakening of the second monitoring light.

14. A tangible and non-transitory recording medium storing a program that causes a computer of an optical transmission device provided with an optical amplifier configured to amplify first signal light, a monitoring light generator configured to generate first monitoring light, an optical multiplexer configured to combine an output of the optical amplifier and an output of the monitoring light generator, and output the combined output to a first optical transmission path, and an optical demultiplexer configured to separate light input from a second optical transmission path, the light including second signal light and second monitoring light, into the second signal light and the second monitoring light, to execute a procedure of controlling the optical amplifier and the monitoring light generator, based on a reception state of the second signal light, and a duration time of light emission and light weakening of the second monitoring light.

* * * * *